Jan. 7, 1947.  G. E. LAMB  2,413,979
BLOCK STACKING AND LOADING EQUIPMENT
Filed Oct. 11, 1943  11 Sheets-Sheet 1

INVENTOR
GEORGE E. LAMB
BY
Cook & Robinson
ATTORNEY

Jan. 7, 1947.  G. E. LAMB  2,413,979
BLOCK STACKING AND LOADING EQUIPMENT
Filed Oct. 11, 1943  11 Sheets-Sheet 2

INVENTOR
GEORGE E. LAMB
BY
Cook & Robinson
ATTORNEY

Jan. 7, 1947.　　　　G. E. LAMB　　　　2,413,979
BLOCK STACKING AND LOADING EQUIPMENT
Filed Oct. 11, 1943　　　11 Sheets-Sheet 3

INVENTOR
GEORGE E. LAMB
BY
Cook & Robinson
ATTORNEY

Jan. 7, 1947.  G. E. LAMB  2,413,979
BLOCK STACKING AND LOADING EQUIPMENT
Filed Oct. 11, 1943   11 Sheets-Sheet 4

Fig. 4

INVENTOR
GEORGE E. LAMB
BY
Cook & Robinson
ATTORNEY

Jan. 7, 1947.  G. E. LAMB  2,413,979
BLOCK STACKING AND LOADING EQUIPMENT
Filed Oct. 11, 1943  11 Sheets-Sheet 5

INVENTOR
GEORGE E. LAMB
BY
Cook & Robinson
ATTORNEY

Jan. 7, 1947.　　　　　G. E. LAMB　　　　　2,413,979
BLOCK STACKING AND LOADING EQUIPMENT
Filed Oct. 11, 1943　　　11 Sheets-Sheet 8

Fig. 10

INVENTOR
GEORGE E. LAMB
BY
Cook & Robinson
ATTORNEY

Jan. 7, 1947.    G. E. LAMB    2,413,979
BLOCK STACKING AND LOADING EQUIPMENT
Filed Oct. 11, 1943    11 Sheets-Sheet 10

INVENTOR
GEORGE E. LAMB
BY
Cook & Robinson
ATTORNEY

Jan. 7, 1947.　　　　G. E. LAMB　　　　2,413,979
BLOCK STACKING AND LOADING EQUIPMENT
Filed Oct. 11, 1943　　　11 Sheets-Sheet 11

INVENTOR
GEORGE E. LAMB
BY Cook & Robinson
ATTORNEY

Patented Jan. 7, 1947

2,413,979

UNITED STATES PATENT OFFICE 2,413,979

BLOCK STACKING AND LOADING EQUIPMENT

George E. Lamb, Hoquiam, Wash.

Application October 11, 1943, Serial No. 505,777

6 Claims. (Cl. 198—30)

This invention relates to improvements in machines and equipment for the assembling, stacking and loading of wood blocks and slabs for convenience in handling.

More particularly, the invention resides in the provision of devices and machines of the character and for the purpose above stated, especially designed for the accommodation of wood blocks and slabs such as those which are prepared and then ground up for the making of paper pulp; it being the principal object of this invention to design a machine that is adapted to receive the prepared blocks, or the wood pieces, as delivered thereto in irregular and promiscuous order, and to aline, even up or center the pieces, and finally, to assemble and stack them in a hopper for deposit on staked trucks or "skips" for easy transportation of the loads to the pulp grinders.

One of the principal objects of the present invention is to provide novel and practical means for causing the wood pieces, which are irregularly and promiscuously conveyed to the machine, to be brought into the same general direction of alinement preparatory to their being advanced to the centering mechanisms and stacking devices.

Another featured object of the invention resides in the provision of a novel arrangement of belts for causing the wood pieces, after being properly alined and deposited on a traveling conveyor, to be centered thereon preparatory to their being closely assembled and placed in the stacking means.

Still other objects of the invention are to be found in the provision of a shuttle conveyor, and in its combination with the stack forming devices for the building up of stacks of wood blocks of definite dimensions for deposit in the skips for easy conveyance from the machine to the grinding devices.

Still further objects of the invention reside in the details of construction of the various parts, in their combination and in their mode of operation, as will hereinafter be fully described.

In accomplishing the above mentioned and other objects of the invention, I have provided the improved details of construction, the preferred forms of which are illustrated in the accompanying drawings wherein—

Briefly describing the present equipment, it comprises, first, a novel spiked roller conveyor mechanism whereby the prepared pieces of wood which are brought by traveling conveyor to the machine in irregular and promiscuous order, are received and, as conveyed therein, are caused to be brought substantially into alinement with the direction of conveyance, and are deposited, substantially parallel, and transversely, upon a chain belt conveyor which operates to deliver them between a pair of spaced, converging, centering belts whereby the ends of the pieces are brought into alinement, that is, all pieces caused to be centered in such manner with reference to the conveyor on which they are transversely disposed that their corresponding ends will be alined. From between the centering belts, the pieces, now properly centered, continue in their travel and are finally deposited from the supporting conveyor, upon a slower traveling conveyor belt, thus to effect the condensing, or a closer assembly, of the pieces, for ultimate delivery onto a shuttle conveyor mechanism for deposit thereby, in successive layers, in a downwardly moving loading mechanism, thus to progressively build up therein stacks of definite dimensions. These stacks, when of predetermined heights, are deposited by the loading mechanism onto conveying trucks, or "skips" and with the complete loading of each truck, it is caused to be moved from the machine and an empty truck brought automatically into position for reception of the next load.

Referring more in detail to the drawings—

The wood slabs, or blocks, which may be prepared at various locations in a building, may be brought to the machine in various ways, for example, by traveling belt conveyors, or the like, or by water flowing in a flume. It is anticipated that the blocks or slabs shall not exceed a definite and predetermined length, but may be of various dimensions otherwise. It is quite common for these blocks to range in width and thickness anywhere from twelve inches by twelve inches, to small slabs of two inch dimensions. These prepared pieces of wood, regardless of size, will hereinafter, for convenience of this description, be referred to as "blocks," and with the understanding that they may be round, irregular or square in their cross sectional shape and may range from small to relatively large pieces, but not to exceed a certain predetermined maximum length.

Figures 2, 2A:
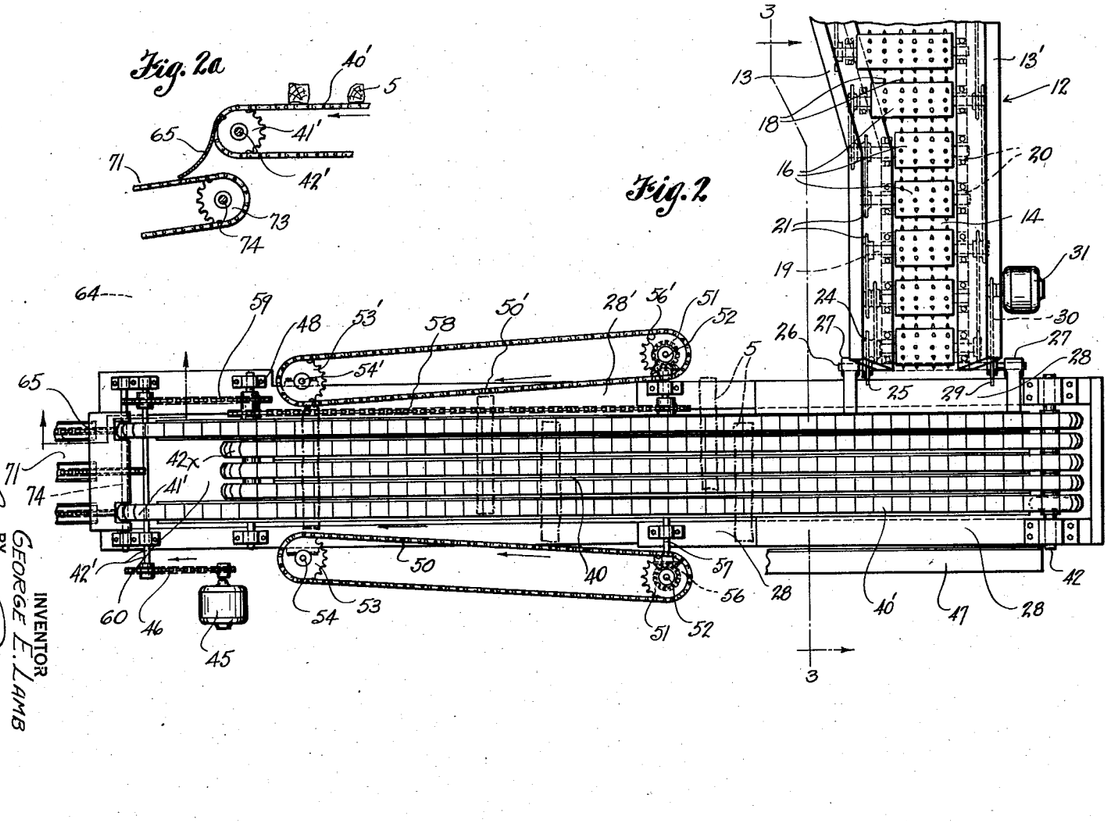
Fig. 2 is a plan view, somewhat enlarged, and showing a part of the feeding conveyor, the block alining means, and the cooperating belts for centering the blocks on the conveyor.
Fig. 2a is a detail showing the driving relationship of and the block alining plate between the centering conveyor and shuttle feed conveyor.
Figures 3, 3A:
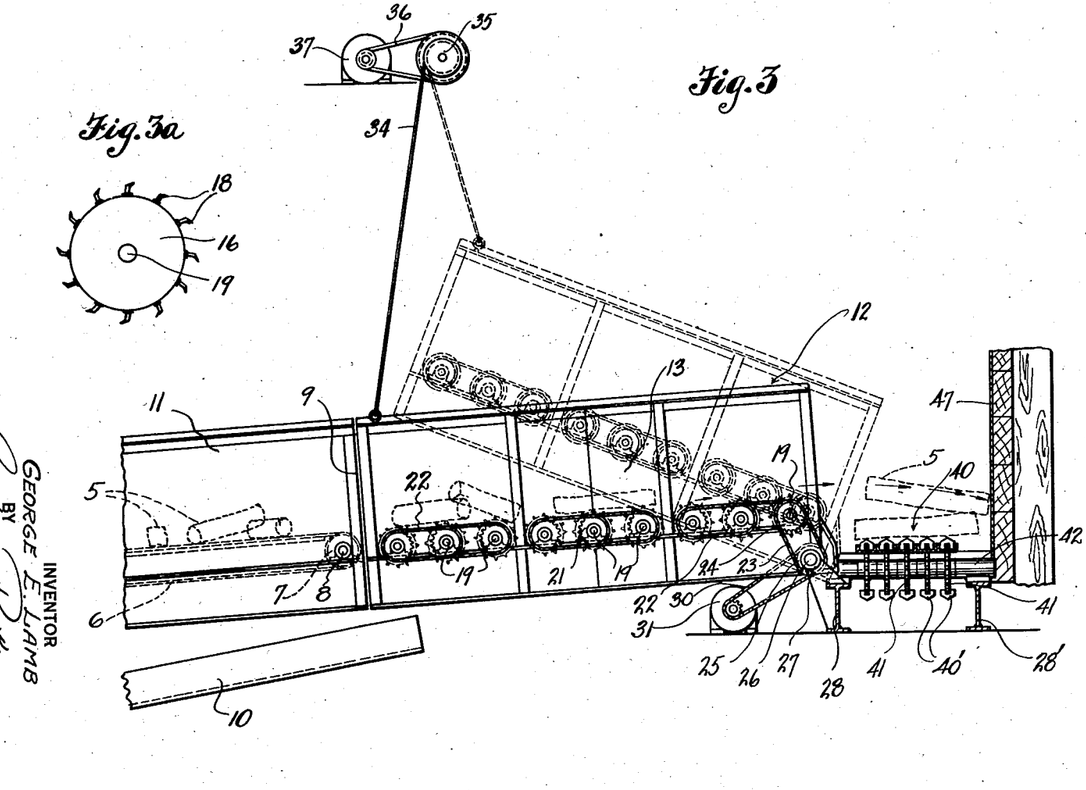
Fig. 3 is a horizontal, cross-section, as seen on line 3—3 in Fig. 2, showing in elevation the feed conveyor and the driving means for the rolls of the block alining conveyor.
Fig. 3a is a sectional detail of one of the spiked rollers of the block alining conveyor.

In Figs. 2 and 3 of the present drawings, for purpose of better explanation, blocks are designated by reference number 5 as being delivered to the machine by an upwardly inclined chain belt conveyor 6. This conveyor comprises a plurality of parallel chain belts which, at the higher end of the conveyor, operate about sprocket wheels 7 fixed on a driven cross-shaft 8 supported in the conveyor frame structure 9. This conveyor, being upwardly inclined, will, in case that it receives the blocks from a flume, operate as a dewatering means for the blocks, and the water that drains from the blocks while being conveyed upon the chain belts may be caught in a return trough 10 that is supported longitudinally of and below the conveyor as observed in Fig. 3.

The blocks 5 are received on the chains of the conveyor 6 in promiscuous order and are conveyed thereby between the outwardly and upwardly inclined opposite side walls 11—11' which extend along the opposite sides of the conveyor.

Figure 1:
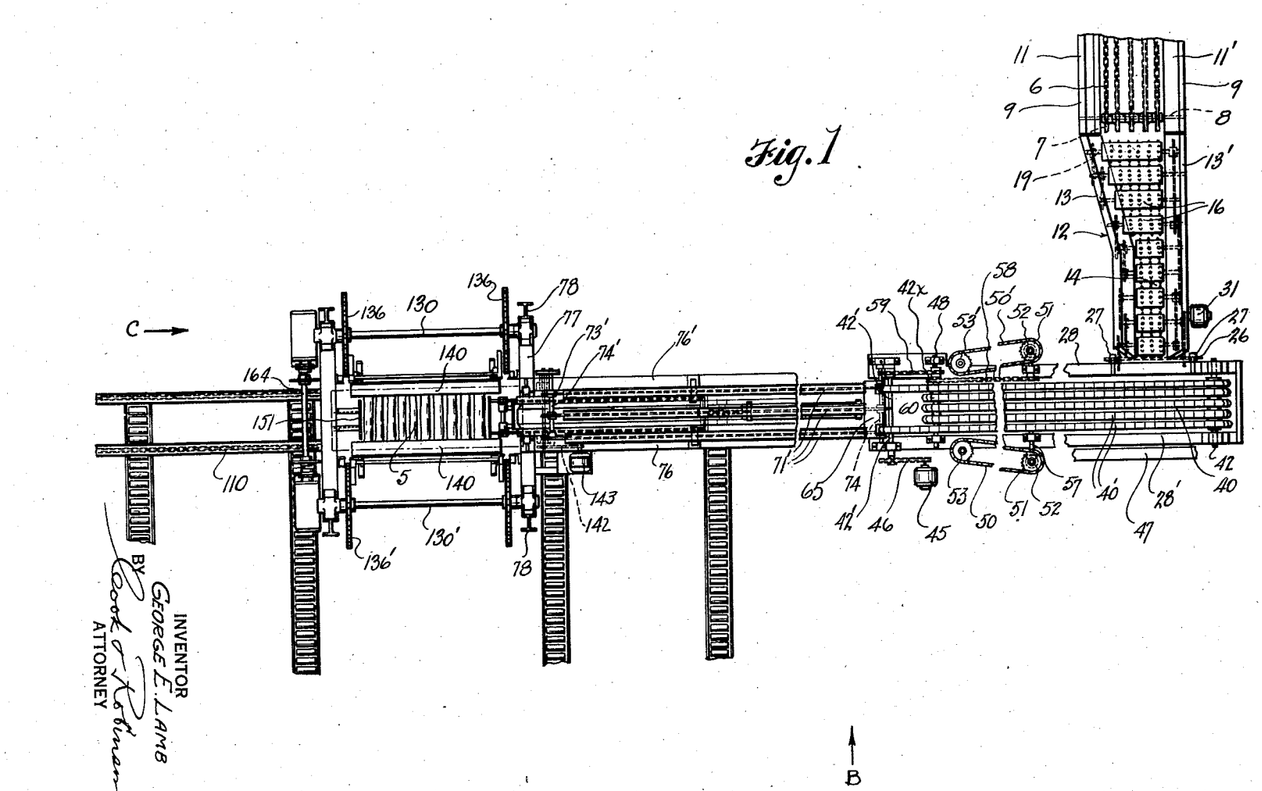
Fig. 1 is a plan view of the present machine showing the present preferred arrangement of mechanisms for the alining, centering, condensing, stacking and loading of wood blocks and slabs into the skips.

From the conveyor 6 the blocks 5 are delivered into a continuing conveyor structure designated in its entirety by reference number 12. This comprises opposite side walls 13—13' which are upwardly and outwardly inclined and which also converge toward each other in the longitudinal direction of travel of the conveyor, as will be understood by reference to Fig. 1, to the receiving end of a rather restricted passage, designated as 14, the walls of which are also downwardly converging for a purpose presently apparent.

Located in the bottom of this conveyor structure 12 and extending its full length is a conveyor bottom comprising a succession of closely arranged transversely disposed driven conveyor rolls 16, each of which is equipped with a plurality of sharp, radially extending spikes 18, as shown in detail in Fig. 3a. If found desirable, these spikes may be somewhat forwardly hooked at their outer ends for obtaining a better yanking effect on the wood pieces passing over the conveyor rolls.

Each of the rolls 16 is mounted on a cross-shaft 19, and these are revolvably mounted in suitable bearings, 20 that are fixed in the frame structure along opposite sides of the conveyor. Mounted on the several cross shafts 19 are driving sprocket wheels 21, and, as shown in Fig. 2, sprocket chain belts 22 operate about alined sprocket wheels of adjacent shafts 19 to provide driving connections through which all rolls may be caused to rotate in unison and in the same direction. Preferably, the driving connections between rolls are arranged as shown in Figs. 2 and 3, and in Fig. 3 it is indicated that the rolls are driven through the mediacy of a suitable sprocket chain belt 23 that operates about a sprocket wheel 24 fixed on one end of the cross shaft 19 that is next adjacent the delivery end of the conveyor structure 12, and about a sprocket wheel 25 that is fixed on a supporting hinge shaft 26. The shaft 26 extends transversely of and through the frame structure of the conveyor 12 at its discharge end, as will be understood by reference to Figs. 2 and 3, as a pivotal support therefor, and is revolvable in mounting bearings 27—27' that are attached to a horizontal beam indicated at 28. The hinge shaft 26 is equipped also with a driving sprocket wheel 29, and this is driven by means of a chain belt 30 which operates over the driven wheel of an electric motor 31 as has been shown in Fig. 2.

It will be understood by referring to Fig. 3 that the conveyor structure 12 is thus hingedly supported at its delivery end from beam 28 by the horizontal cross-shaft 26. At its receiving end the conveyor structure is held in suspension, normally alined with conveyor 6, but may be vertically adjusted when such is desired. The means for suspending the structure 12 comprises a cable connection 34 that is wound on a drum 35. The drum has a driving belt connection 36 with a reversible electric motor 37; the arrangement of parts being such that through the mediacy of the electric motor the cable may be wound in or paid out from the drum to raise or to lower the receiving end of the conveyor 12 accordingly. It will thus be understood that should a jam of blocks occur at the entrance, or in the converging portion of the conveyor 12, it may be cleared by lifting the structure to a steeply inclined position as has been indicated in dotted lines in Fig. 3, thus to dump the clogging material forwardly. While the structure 12 is in its lifted position, blocks advanced by conveyor 6 will merely be dropped into the trough below.

Assuming that the blocks 5 are being delivered by the conveyor 6 to the conveyor 12, they will, on passing over the spiked rollers, be engaged by the spikes 18, and, due to the character of the spikes and the speed and direction of rotation of the rolls, will be yanked or thrown upwardly and forwardly. As a result of the upward and forward throwing, jerking and bouncing of the blocks as they pass into the restricted portion 14 of the conveyor passage, they will be brought substantially into alinement with the direction of travel. This initial alining of the blocks in the restricted passage 14 is greatly facilitated by reason of the downward convergence of the side walls of the conveyor structure and by reason of the convergence or restriction of the passage in the direction of travel.

The action of the spiked rolls, that are immediately adjacent the discharge end of the conveyor, is to throw most of the blocks directly from the end of the conveyor to drop onto a horizontally traveling conveyor 40 that operates in a direction at a right angle to the direction of conveyor 12 as will be understood by reference to Fig. 2 of the drawings.

The conveyor 40 comprises a plurality of camel back chain belts 40' operating horizontally and in parallel relationship. In the present instance five chains are used, and the two outer chain belts pass about sprocket wheels 41 and 41' that are fixed respectively on cross-shafts 42 and 42' at the opposite ends of the conveyor and which are revolubly mounted in bearings carried upon the horizontal beams 28 and 28' of the supporting frame structure for the conveyor; the shaft 26 being supported from beam 28 as was previously explained.

The intermediate chains of this conveyor 40 are somewhat shorter than the outside chains and operate about sprocket wheels on the cross-shaft 42' and about sprocket wheels 42x that are mounted on a cross-shaft 48. The cross-shaft 48 is supported by the beams 28—28' and is spaced inwardly from the shaft 42, as observed in Fig. 2, for a purpose that will presently be explained.

The top runs of the several conveyor chain belts of conveyor 40 are supported for travel in the same horizontal plane, and are driven in unison through the mediacy of the cross-shaft 42; this being driven by means of an electric motor 45 that is operatively connected to the shaft by a sprocket chain belt 46, operating over sprocket wheels on the motor shaft and on shaft 42.

As will be noted by reference to Fig. 3, there is a vertical "back stop" wall 47 erected parallel with the conveyor 40 along that side directly opposite the discharge end of the conveyor 12. It is important in the delivery of the blocks from the conveyor 12 that they be thrown endwise by the action of the spiked rolls and that the trajectory be such that each block strikes at its forward end against the back stop wall. This will insure that each block will fall in a position substantially transverse of the conveyor chains. When this is not done, there is the tendency of the rear end to be hung up as the forward end advances and thus the piece is caused to be disposed angularly of the direction of travel. Therefore, the action of the spiked rolls as a means for throwing the blocks clear of the conveyor and against the back stop is important to successful operation.

With the blocks thus delivered endwise against the back stop wall, they will invariably drop directly down onto the conveyor 40 transversely of the direction of travel, or within an angle of 15° of a direct, transverse position, and even those blocks which are not thrown far enough to strike the back stop will not, upon falling onto the conveyor chains, be so far from a direct transverse position but what this can be corrected by the means provided for this purpose at the discharge end of this conveyor 40, as will later be described.

It is to be considered, however, that the blocks may not be centered on the conveyor 40 when they drop into place thereon, and some may extend at their ends farther to one side or the other than others, and anticipating this result, a mechanism is provided for bringing all blocks to a position centered on the conveyor. This centering of the blocks is necessary in order that they may later be properly assembled for stacking and loading.

The centering means is shown best in Fig. 2, and it comprises the following devices:

Located at opposite sides of the conveyor 40 near its delivery end, and extending in a direction lengthwise thereof, are the co-acting centering belts 50 and 50'. These belts operate, at the ends nearest the conveyor 12, about sprocket wheels 51 on vertical shafts 52 and 52', respectively, and extend at their opposite ends about sprocket wheels 53—53' on vertical shafts 54 and 54' respectively. These shafts 52—52' and 54—54', are so disposed that the two centering belts form between them a pocket that converges to some extent in the direction of travel of the conveyor 40. The spacing of these belts at the entrance into this pocket is somewhat greater than the full width of the conveyor 40, while at the discharge end of the pocket they are spaced apart a distance that corresponds to the established maximum length of the blocks. The disposition of these centering belts is symmetrical with respect to the opposite sides of the conveyor 40, and they are driven in unison, and in a direction whereby their inner runs travel with the conveyor 40 and at the same speed thereof.

Figure 4:
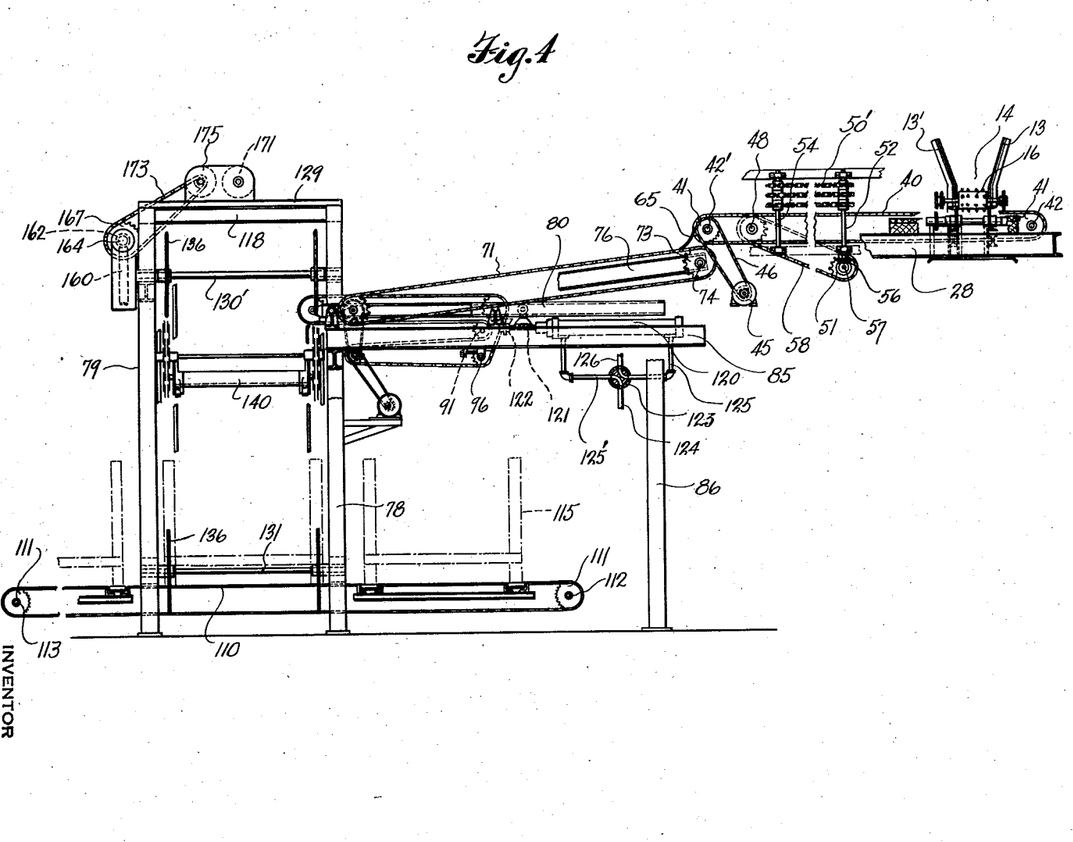
Fig. 4 is a side elevation of the machine, as seen when looking in the direction of arrow B in Fig. 1.

It is preferred that each of the centering belts, 50 and 50', shall comprise two or more chains in close parallel relationship. Fig. 4 indicates the belts as comprising three chains each. The driving of these belts is through the driving of the vertical shafts 52—52' which have geared connections at their lower ends, as indicated at 56, with a cross-shaft 57. The cross-shaft 57 is revolvably supported from the under side of the beams 28—28', and is driven by a chain belt connection 58 that passes about sprocket wheels on the cross-shafts 57 and 48, and the latter shaft, in turn, is driven through a belt connection 59, that operates about sprocket wheels on shafts 48 and 42'.

It will be understood that, with the centering belts 50 and 50', so disposed and driven, any of the blocks which are off center relative to the conveyor 40, that is, any block that extends too far to either side of the conveyor, will, upon passing between the converging centering belts, be engaged by one or the other and pushed back to such position that all blocks of full length will be exactly centered relative to the conveyor, and no block, even though it be less than full length, will extend beyond a predetermined limit line at either side of the conveyor. The effect of these centering belts is to bring the ends of all transverse pieces into alinement lengthwise of the conveyor.

It is desirable that all short blocks, or those that have a length less than that desired for use, be removed from the conveyor at this point, and their removal is accomplished by reason of the terminating of the intermediate chains of the conveyor 40 somewhat short of the outside chains at the discharge end of this conveyor. This condition leaves an open space, as indicated at 60 in Fig. 2 bounded by the shafts 42' and 42x, and the opposite side chains. Any block that is not long enough to span the distance between the outside chains will be dropped through this open space to a chute 64 for discharge to the side of the machine.

It will be understood that the shafts 54 and 54' which mount the sprocket wheels that carry the delivery ends of the centering belts, can be adjusted laterally to vary their spacing to accommodate blocks of various established lengths.

At the delivery end of the conveyor 40, the blocks are discharged onto a smooth, downwardly directed and concave plate 65, whereby they are directed onto a chain conveyor belt 71. This plate is shown in Figs. 2, 2a and 4, and it is so disposed as to provide a downward drop of the blocks from the conveyor 40 to conveyor 71 that will result in bringing each of them to a position exactly transverse of the direction of travel. The concaved shape of the plate is important since it provides for retarding the forward end of a falling piece and brings the piece to a directly transverse alinement.

The conveyor 71, as here shown, comprises three spaced parallel conveyor chain belts 71' operating at their opposite ends about sprocket wheels 73 and 73' on cross-shaft 74 and 74', and the conveyor is driven at a slower speed than the conveyor 40 in order that the blocks as successively received from the conveyor 40 will be placed in close order. These cross-shafts are revolubly mounted in bearings 75 carried by the longitudinal beams 76 and 76' of a supporting frame structure, and the conveyor is driven by a belt connection indicated at 72 that extends between the shafts 74' and a driven shaft later to be described, as noted in Fig. 8.

Figure 8:
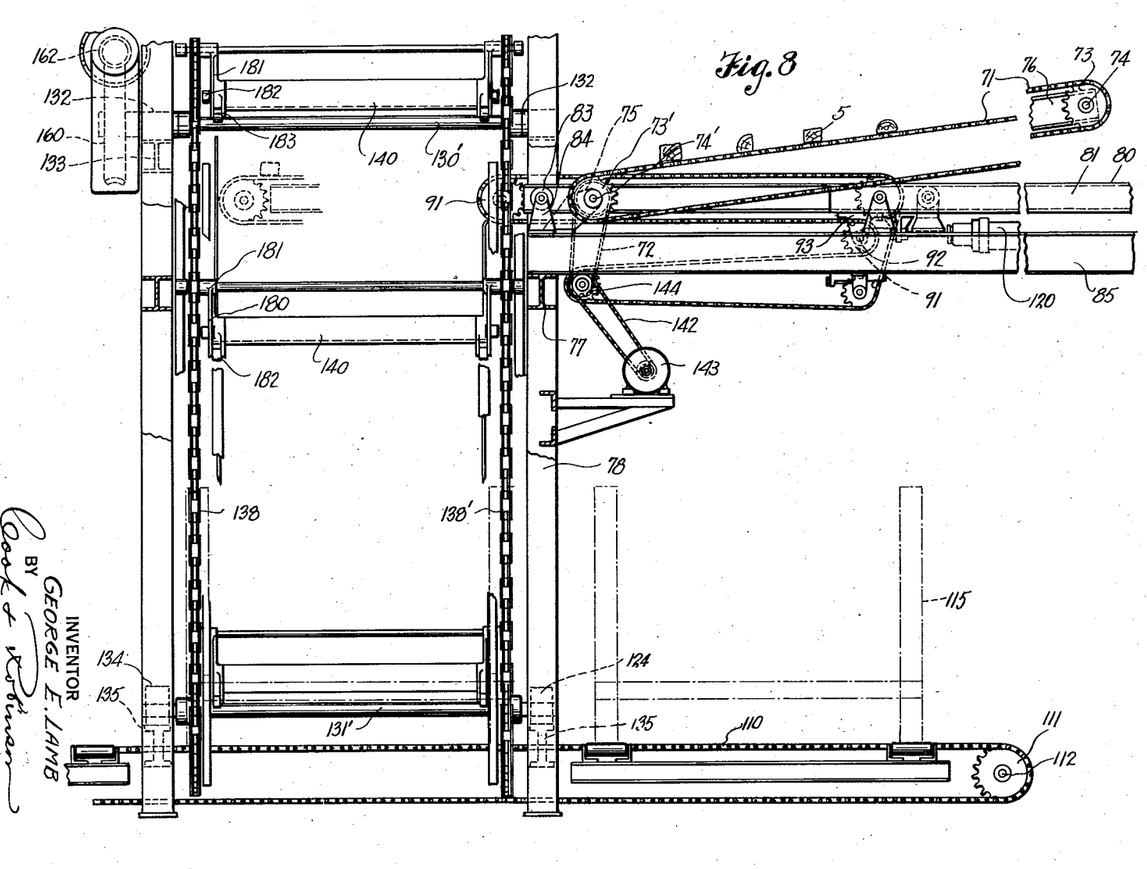
Fig. 8 is an enlarged, side elevation of the shuttle conveyor, the stacking device, and load forming and depositing means.

The conveyor 71 which will be referred to as the "shuttle feed conveyor" is somewhat downwardly inclined as illustrated in Figs. 4 and 8. This inclination of conveyor 71 is a structural necessity as will be better explained in connection with the description presently given of the shuttle conveyor.

Figures 5, 6, 7:
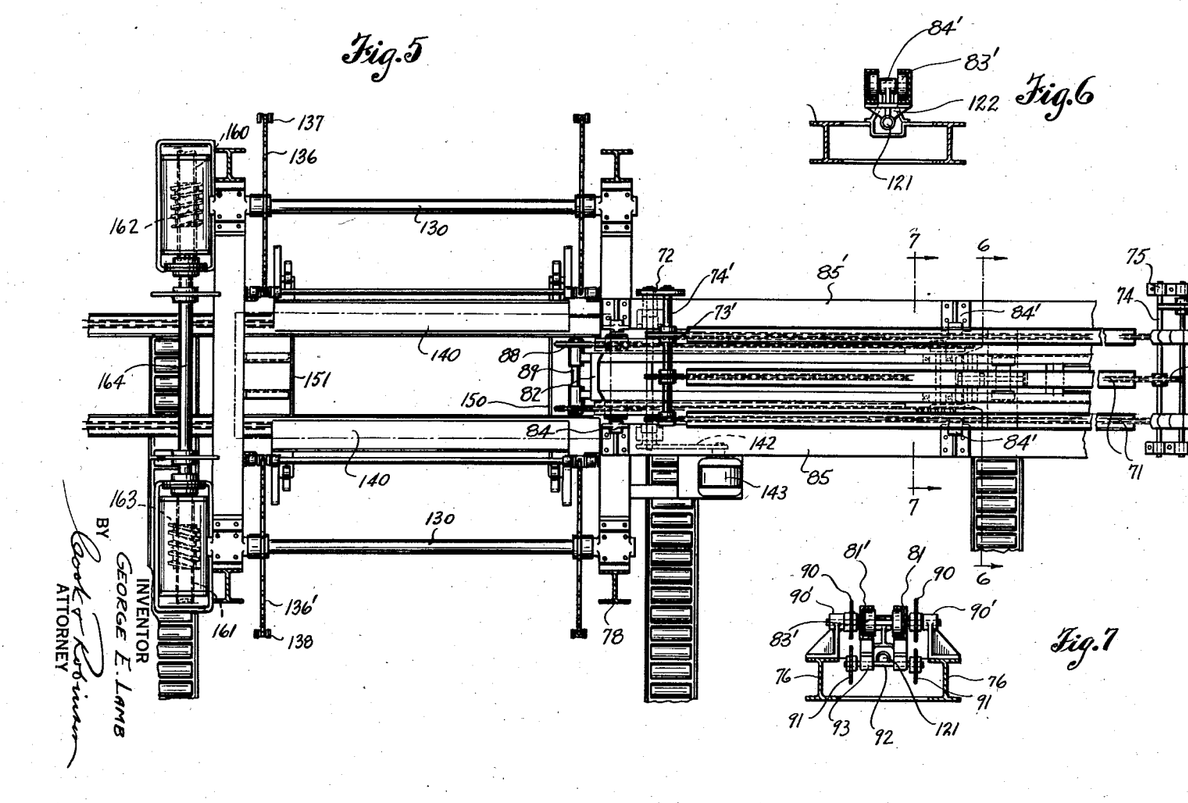
Fig. 5 is an enlarged plan of the delivery end portion of the machine, showing the shuttle loading conveyor, the shuttle conveyor, the stacking means and skip loading devices.
Fig. 6 is a cross-sectional detail taken on line 6—6 in Fig. 5.
Fig. 7 is a cross-sectional detail, taken on line 7—7 in Fig. 5.

At the lower end of the belt conveyor 71, the longitudinal, opposite side beams 76 and 76' are supported by a cross-beam 77, shown in Figs. 5 and 8, and this cross-beam, in turn, is supported by two corner posts 78 of a vertical frame structure 79, which is shown in side elevation in Fig. 4. The beam 77 is located at a suitable elevation for the convenient travel of skips below the shuttle conveyor, which is presently to be described, to positions for loading.

The shuttle conveyor mechanism includes a horizontally reciprocable carriage located below the delivery end of the shuttle feed conveyor 71 and extending in the same direction. This carriage is designated in its entirety by reference numeral 80 and, as best illustrated in Figs. 16 and 17, it comprises coextensive parallel opposite side beams 81 and 81' joined rigidly at their ends in spaced relation by cross beams 82. Each longitudinal beam is made up of two channel beams secured together, back to back, and as observed in Fig. 15, the outer channels extend only approximately half the length from the forward to the rearward ends of the inner channel members.

The shuttle carriage is supported for reciprocal travel by four rollers. Two of these rollers, 83, are located closely adjacent the delivery end of the conveyor 71, and are mounted by brackets 84 fixed upon the opposite side beams 85 and 85' of a supporting structure for the carriage which includes the cross beam 77 and the posts 78 and 86, as seen in Fig. 4. Two other rollers, 83', supported by brackets 84' which are mounted on a part of the supporting structure, likewise support the carriage by engagement with the beams 81 and 81' at a distance spaced from the rollers 83.

Figure 15:
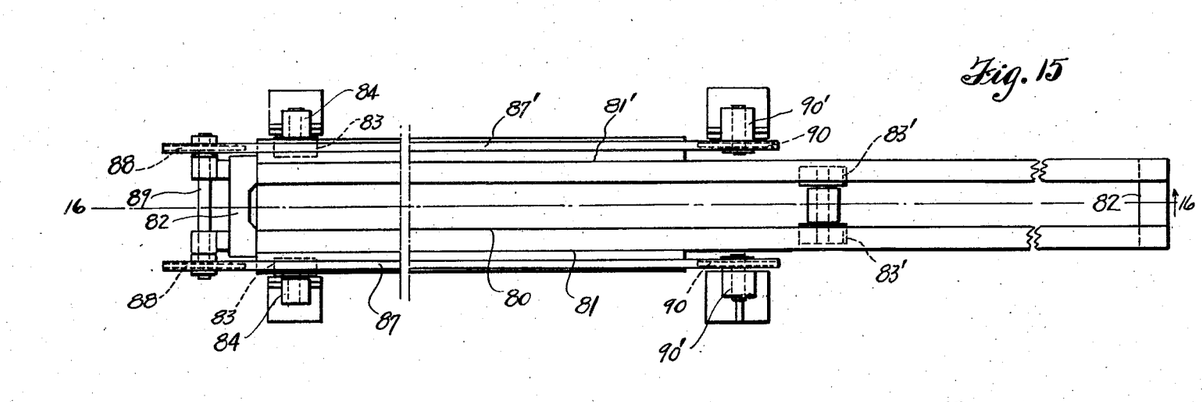
Fig. 15 is a plan view of the shuttle conveyor carriage.
Figure 16:
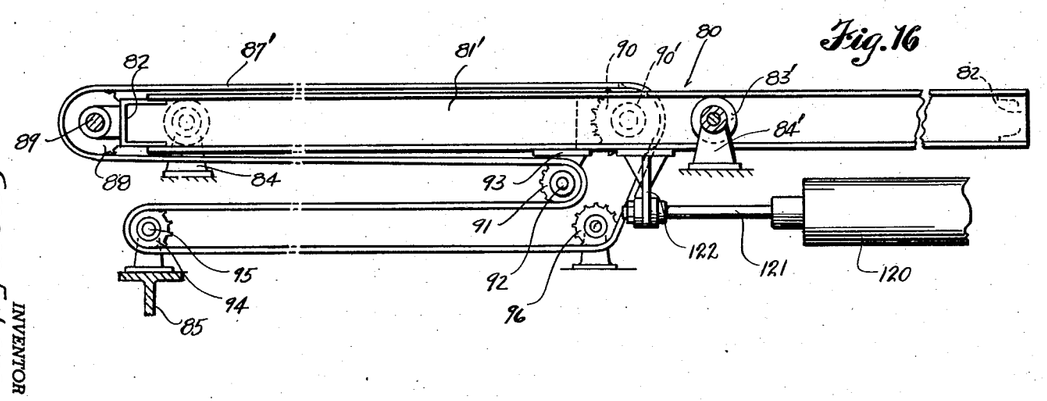
Fig. 16 is a section on the line 16—16 in Fig. 15.

As observed best by reference to Fig. 15, the rollers 83 are disposed within the horizontal flanges of the outwardly facing channel beams, and the rollers 83' are likewise disposed between the flanges of the inwardly facing edges of the channel beams, and thus the four rollers coact to maintain the carriage in horizontal position during its reciprocal travel, and the travel of this carriage is from a position of retraction, at which its forward end is just slightly beyond the delivery end of the conveyor 71, to a position considerably extended, as understood by comparison of the positions of the carriage shown in Fig. 8.

The shuttle carriage mounts thereon two parallel, spaced belts 87 and 87' extending lengthwise of the carriage and having horizontal top runs that pass at the forward end of the carriage over supporting sprocket wheels 88 which are mounted on the ends of a horizontal cross shaft 89 which, in turn, is mounted on the carriage at its forward end. At their rearward ends, these belts pass over sprocket wheels 90 which are supported by brackets 90' fixed to the supporting frame structure for the carriage. These top runs of the belt travel upon the top flanges of the longitudinal beams 81—81' and serve, as will presently be understood, to convey the blocks as received from the conveyor 71, outwardly along the carriage. After passing downwardly over the sprocket wheels 88 at the forward end of the shuttle carriage, the belts 87—87' pass rearwardly for a substantial distance below the carriage, then pass over and downwardly about sprocket wheels 91 on a cross shaft 92 supported by brackets 93 from the under side of the shuttle carriage; then the belts again extend forwardly to the frame 79 and about sprocket wheels 94 on cross shaft 95 supported from the beams 85. Then the belts extend rearwardly and about sprockets 96; then upwardly from the latter sprockets and about the sprockets 90.

The sprockets 94 and 96 are spaced apart a distance substantially equal to the reciprocal travel of the shuttle. Thus the sprockets 91 which are fixed to and which move with the carriage, operate to take up slack in the shuttle belts incident to the reciprocal movements of the shuttle between its fully retracted and fully extended positions.

The driving belt 72 for the conveyor 71 operates about a sprocket wheel on the cross shaft 94, as seen in Fig. 8.

Figure 13:
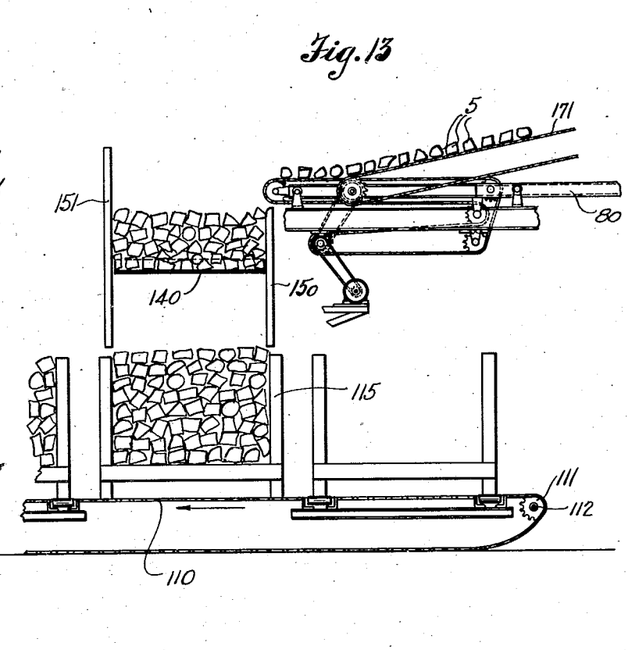
Fig. 13 is a side view similar to that of Fig. 11, illustrating the depositing of a load in a skip and the partial formation of another load.

The shuttle carriage is reciprocally movable, in the direction of travel of the conveyor 71, and may be shifted, as later explained, from a position beneath the lower end of conveyor 70 to a position extended somewhat beyond it as will be understood by noting its positions in Fig. 11 and Fig. 13.

Before going into detail with respect to the construction and mode of operation of the block stacking and loading devices, it will be explained, in brief, that the empty skips for reception of the loads are first brought to a position beneath the shuttle conveyor structure, for advancement, as needed, by an intermittently moving belt conveyor, indicated at 110 in Figs. 4 and 8, to the loading position within the lower end of the vertical frame structure 79. Then, upon receiving their loads, the skips are moved by the conveyor 110 to a position for lateral discharge onto a roller conveyor whereby they may be taken to a point of use.

The conveyor 110 comprises two parallel chain belts that operate, at their opposite ends about sprockets 111 on cross shafts 112 and 113, and the drive of the conveyor is through a connection with one or the other of these shafts.

A skip of preferred type is designated at 115. It comprises a horizontal bottom structure with four vertical corner posts; the width being somewhat less than the length of the blocks to be loaded thereon. After a skip has been disposed on the conveyor 110, a controlled advance movement of the belt first locates the skip in proper position for loading, then, after it is loaded, moves to position for discharge from the conveyor.

The vertical frame structure 79, previously mentioned, is of rectangular form, comprising four corners posts 78 which, at their upper ends are connected by cross beams 118 on which the power devices which operate the loading mechanisms are mounted, as presently explained. This vertical frame extends somewhat above the delivery end of conveyor 71 and the horizontal line of travel of the shuttle carriage. Thus, in their reciprocal action, the shuttle conveyor and carriage move into and from this frame as is indicated in Fig. 8.

The reciprocal actions of the shuttle carriage are effected by a controlled application of pressure medium to the cylinder of a hydraulic jack 120 that is fixedly mounted in the supporting structure for the shuttle carriage. The jack piston rod 121 is connected at its outer end to a bracket 122 depending from the carriage.

Pressure medium is selectively applied to the ends of the jack cylinder to control the piston rod action by manipulation of a four-way control valve 123, which has a pipe connection designated at 124 with a source of supply of hydraulic medium, pipe connections 125 and 125' with opposite ends of the jack cylinder and a waste pipe connection indicated at 126, as seen in Fig. 4.

Mounted in the upper portion of the frame structure 79 is a pair of horizontal, spaced cross shafts 130 and 130', and likewise, in the lower portion of the frame are paired, horizontal cross shafts 131 and 131'. The upper shafts are revoluble in bearings 132 fixed on horizontal frame members 133 and the lower shafts likewise are revoluble in bearings 134 on horizontal frame members 135. The upper shafts are alined vertically with corresponding lower shafts, in planes that are parallel with and at opposite sides of the path of travel of the shuttle conveyor. Fixed on each of the shafts 130 and 131 are two rather large sprocket wheels 136 about which vertically operating chain belts 137 and 137' extend. Likewise, fixed on the shafts 130' and 131' are two spaced sprocket wheels 136' about which sprocket chain belts 138 and 138' operate.

Figure 12:
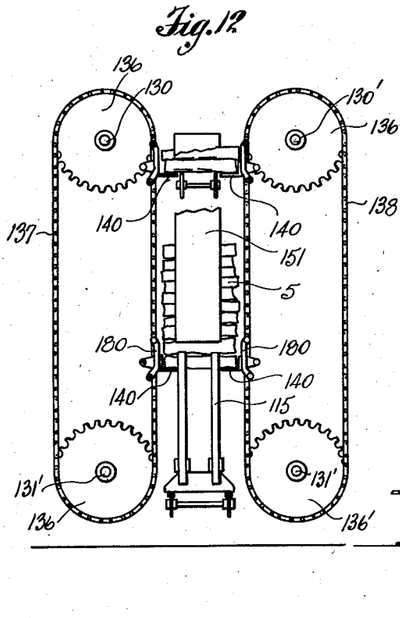
Fig. 12 is an end view of the same parts.
Figure 14:
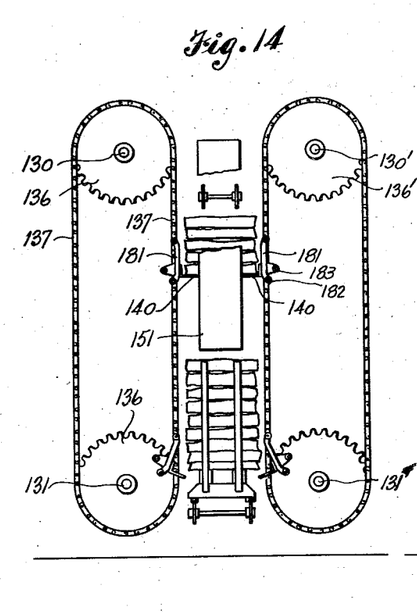
Fig. 14 is an end view of the same.

As observed best in the diagrammatic views of Figs. 12 and 14, the adjacent or inside runs of these two sets of belts, at opposite sides of the line of travel of the shuttle, are spaced apart a distance that is somewhat more than the lengths of the blocks that are to be stacked, and supported by and extending between paired belts, are horizontally disposed, angle bars 140 so arranged on the co-acting pairs of belts as to serve as supports for the opposite ends of blocks in the building up of stacks of blocks between the belts. The mounting of the angle bars is later described.

In the operation of this mechanism, the two pairs of chain belts which mount the angle bars 140, are driven in unison and in such direction that corresponding bars 140 of the two sets of paired belts will be brought simultaneously into position at opposite sides of the shuttle conveyor to receive and support a layer of blocks thereon, then in accordance with the building up of the stack of wood by the controlled action of the shuttle conveyor, as presently described, the belts are caused to travel downwardly, thus to maintain the top of the stack at a level that is best suited for receiving the blocks from the shuttle conveyor.

The shuttle conveyor belts are driven at the same speed and in the direction of the chains of their shuttle feed conveyor by a driving belt connection, indicated at 142, with an electric motor 143; the belt operating over a sprocket wheel 144 on cross shaft 94.

Figure 11:
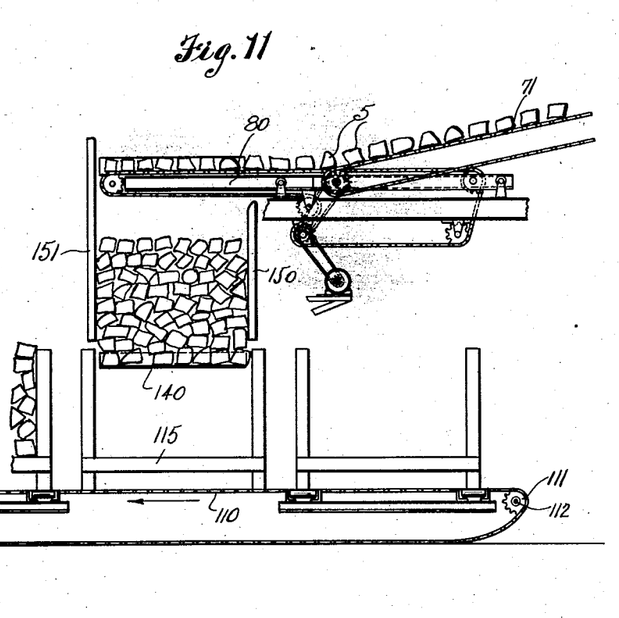
Fig. 11 is a side view of the loading end of the machine, diagrammatically illustrating the method of stacking the blocks for deposit in a skip.

The operation of the shuttle conveyor and control of the loading chain belts for the building up of a load is as follows:

Assuming first that the two sets of loading belts 137—138 are being driven in proper direction, indicated by arrows, and at proper speed, that the shuttle chains are being driven in the direction as indicated by the arrow adjacent thereto in Fig. 11, and that the shuttle has been shifted to its extended position as shown in Fig. 11, it will be understood that the blocks carried out by the shuttle feed conveyor 71 will be successively deposited in close order on the outwardly moving runs of the belts of the shuttle conveyor. When a layer of blocks has been formed, to the full length of the extended conveyor, it is then caused to be retracted by an application of medium to hydraulic jack 120, and incident to this retraction, and by reason of the travel of the belts, the blocks then supported on the belts will be laid down on the horizontal flanges of paired supporting angle bars 140 which will have been brought into position at this time, to receive them, as observed in Figs. 11 and 12. Successive operations of extending the shuttle belt, filling it with blocks from conveyor 71, and then unloading the shuttle conveyor by retraction of the carriage as above described, will cause successive layers of blocks to be laid onto the load, the top of which is kept at proper level to receive the blocks, by reason of a controlled rate of lowering of the loader chain belts.

In the building up of a load in this way, it is formed to an exact length by reason of the stack being built up and lowered between opposite end boards 150 and 151, as shown in Fig. 11, that are fixed in the frame structure 79 in positions with which the end posts of the skips will be alined to receive the load.

Figure 9:
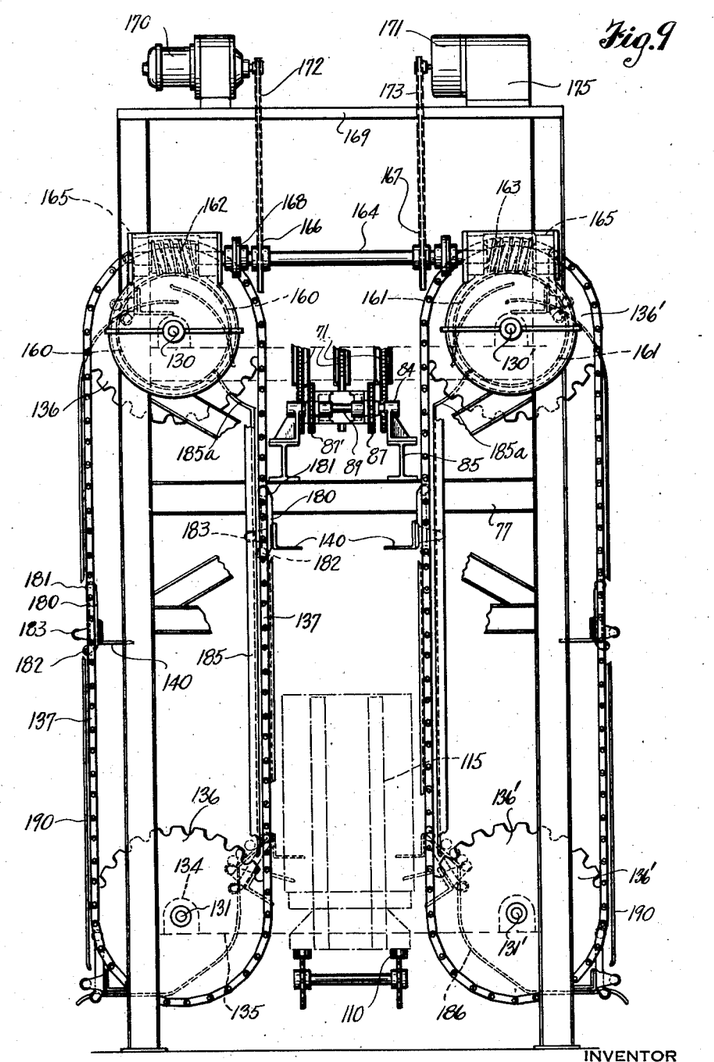
Fig. 9 is an end elevation of the stacking, forming and loading mechanism as seen when looking in the direction of arrow C in Fig. 1.
Figure 10:
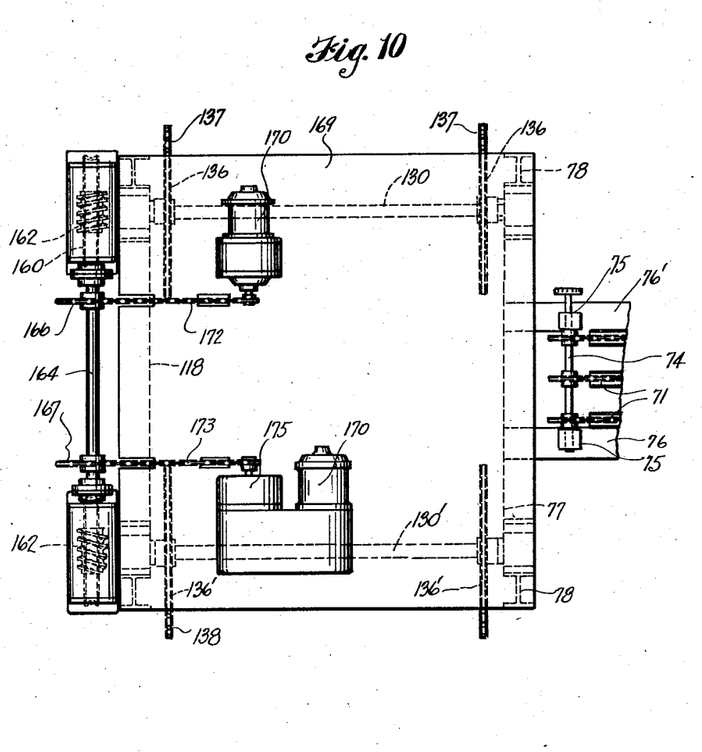
Fig. 10 is a plan view, showing the location and connection of driving motors and shafts for control of the stack forming and loading devices.

The means for driving and controlling the action of the loader chain belts which carry the angle bars 40, is shown best in Figs. 9 and 10 and comprises the following devices:

Fixed on the outer ends of the shafts 130 and 131, are driving worm gears 160 and 161, and meshing with these gears, respectively, are worms 162 and 163 on a driven cross-shaft 164 that is revolubly mounted in supporting bearings 165 carried by housings 166 that enclose the worm gears. Mounted on the shaft 164 are sprocket wheels 166 and 167; the gear 166 being operatively connected with the shaft through an over running clutch device 168, while gear 167 is fixed directly thereto.

Mounted upon the cross beams 118 of the frame 79 is a plate 169 on which eelctric motors 170 and 171 are mounted. These motors have their driving shafts operatively connected, respectively, with the sprocket wheels 166 and 167, by chain belts 172 and 173. A feature of the driving of the loading belts is that the motor 171 operates through a variable speed driving means, indicated at 175, whereby the rate of travel of the loading chains may be regulated to best suit the normal delivery of wood being handled at any particular operation, while the motor 170 has a high speed connection, and this motor is thrown into operation at the time of changing from one set of carriers to another for a quick lowering of a finished load, or it may be thrown into operation at any time when a faster lowering of the carriers is desirable, such, for example, to take care of any sudden run of large blocks of wood which may come on suddenly and be of too short durations to make readjustment of the other motor practical.

Assuming that a load has been built up by the successive operations of filling and unloading the shuttle conveyor, as previously described, the load may then be lowered quickly, through the predetermined interval, by transferring the driving power from the motor 171 of normal speed to the high speed motor 170, thus by quick travel to locate the lower end of the finished load in entering position between the upper ends of the stakes of the waiting skip, which is brought into position with the start of the downward travel. This quick lowering of a finished load provides a desired spacing between successive loads; for example, as in Fig. 11, which is required in order that a loaded skip may be moved from loading position and an empty skip be brought into loading position without requiring that the down travel of the loading belts be stopped. After a filled skip has been removed and a finished load has thus been lowered, the loading belts may, by shifting of the driving connection from the high speed motor back to the normal speed motor, be caused to assume the normal rate of downward travel while another load is being built up and the finished load lowered and deposited in the receiving skip.

The releasing of the finished load is effected by means as follows: Referring again to Fig. 9, it is to be observed that the horizontal angle bars 140, suspended from the paired loading belts for supporting the loads during their formation, are each suspended from the corresponding paired belts at the inside thereof by means of two hanger brackets 180. These brackets are pivotally fixed at their upper ends as at 181, to links in the corresponding belts to permit a necessary oscillating action of the bars. At their lower or swinging ends, the brackets are each equipped with two laterally offset guide rollers 182 and 183. As the bars are brought to load receiving position, the rollers 182 come into rolling contact with the inside surfaces of vertical guide rails 185 that are fixedly supported in the loading structure. While the load supporting bars 140 are moving downwardly through that certain extent of travel during which a load is being built up, lowered and deposited, the bracket guide rollers 182 engage these rails and the paired bars 140 are thereby held in an exact spacing for the support of a load thereon. As the load is finally lowered into the receiving skip, the outer guide rollers pass from the lower ends of the rails 185 and the other sets of guide rollers 183 move into contact with the outside surfaces of outwardly directed guide rails 186, which, incident to a continued downward travel of the belts, causes the brackets to be swung outwardly, thus moving them through the successive dotted line positions shown in Fig. 9 whereby the bars 140 are caused to be freed from the load and the latter deposited upon the bottom of the skip.

With the load thus deposited, the hanger brackets continue to ride outwardly on the guide rails 186 until their pivot points have passed to the outside of the lower belt carrying sprockets and started upward, at which time the guide rollers 183 will move into guiding contact with vertical guide rails 190 which extend upwardly to the level of and are then curved inwardly to extend across the supporting shaft for the upper belt mounting sprockets. This causes the bars 140 to be brought again into proper position of suspension from their respective chains whereby, as the belts continue to carry the brackets across the top of the supporting sprockets and downwardly, the rollers 182 contact with inwardly inclined upper end portions 185a of the rails 185 and the bars 140 are again brought into position for reception of a load, as deposited thereon by the unloading action of the shuttle conveyor.

In the present instance, I have shown each of the paired loaded belts as being equipped with five of the load supporting bars 140. However, this may be changed to suit conditions or dimensions as required.

After a load has been deposited in a skip, the conveyor belt 110, on which it is supported, may be caused to move through a predetermined distance of travel whereby to locate the loaded skip in position for lateral discharge therefrom and to bring the waiting empty skip into position for reception of the next load. In this instance, I prefer to use roller conveyors for bringing the skips into position and for discharging them from the intermittent belt, and it is preferred also that sections of these roller conveyors be mounted to permit certain tilting so that the travel of the skips to and from the intermittent belt will be effected by gravity.

I claim:

1. In a machine of the character described, a block delivery conveyor comprising a trough-like structure for the reception of blocks of definite length in promiscuous order and comprising a portion having opposite side walls converging from a spacing greater than the length of the blocks to a spacing that will permit the blocks to pass therefrom only in an endwise relationship and a succession of feed rolls extending transversely between the said side walls and forming a bottom wall for the trough-like structure, spikes extending from the rolls and means for driving the rolls, at such speed as to effect the bouncing advancement thereby of blocks along the conveyor.

2. In a machine of the character described, a block delivery conveyor comprising a trough-like structure for the reception of blocks therein in promiscuous order, and having spaced opposite side walls and a succession of closely spaced transverse rolls forming the trough bottom, spikes extending from the rolls and means for driving the rolls to cause said spikes to effect the bouncing advancement of the blocks within the troughs; said side walls of the trough converging downwardly and also toward the discharge end of the trough.

3. In a machine of the character described, a block delivery conveyor comprising a trough-like structure for the reception of blocks within a definite range of lengths therein at one end in promiscuous order and having opposite side walls and a succession of transversely disposed rolls forming the trough bottom, spikes extending from the rolls to engage with the blocks, and means for driving the rolls to cause said spikes to effect the advancement of blocks along the trough; said side walls of the trough being spaced at the receiving end of the conveyor a distance greater than the maximum length of the blocks and converging to and continuing as a relatively narrow passage to the discharge end for endwise passing of the block therein.

4. In a machine of the character described, in combination, a block delivery conveyor and a block aligning conveyor operating horizontally and at right angles to each other; said delivery conveyor comprising a trough-like structure, adapted to receive blocks of predetermined lengths in promiscuous order therein, having opposite side walls converging from a spacing greater than the length of the blocks to a relatively narrow passage along the discharge end of the conveyor through which the blocks can only move in an endwise direction, and opening to the alining conveyor, and a succession of transversely disposed, spiked rolls forming the trough bottom, and means driving said rolls for effecting the advancement of blocks by the rolls by their tossing them along the trough by the spikes, and finally to be thrown endwise from the delivery conveyor transversely onto the alining conveyor.

5. In a machine of the character described, in combination, a block delivery conveyor and a block alining conveyor operating horizontally and at a right angle to each other; said delivery conveyor comprising a trough-like structure having opposite side walls, converging downwardly toward each other and also converging in the longitudinal direction to a narrow passage through which the blocks can advance only in an endwise direction, and a succession of spiked rolls forming the trough bottom, means for driving the rolls at high speed to cause the spikes to advance blocks along the trough with a jumping action, and to throw them endwise from the trough and transversely of the alining conveyor, and a stop wall disposed at the side of the alining conveyor opposite the discharge end of the trough against which the ends of the blocks will engage to drop the blocks transversely onto the conveyor.

6. In a machine of the character described, in combination, a block delivery conveyor and a block alining conveyor extending horizontally at a right angle to the delivery conveyor; said delivery conveyor comprising a trough-like structure having spaced opposite side walls converging downwardly and toward each other and adapted to receive blocks of predetermined lengths in promiscuous order between them, and converging to a narrow passage permitting only endwise advancement of the blocks therein, and a succession of transversely disposed rolls forming the trough bottom, spikes extending from the rolls to engage the blocks, means driving the said rolls for effecting advancement of the blocks by said spikes along the trough into alinement therewith and to effect their being tossed endwise from the narrow passage onto the alining conveyor transversely thereof and an abutment wall at the far side of the aligning conveyor and extending to a substantial height as a stop against which the pieces as tossed from the delivery conveyor will engage.

GEORGE E. LAMB.